Aug. 1, 1933. R. A. SCHAFER 1,920,596
HYDRAULIC ACTUATING AND CONTROL VALVE MEANS
Filed Feb. 19, 1929 4 Sheets-Sheet 4
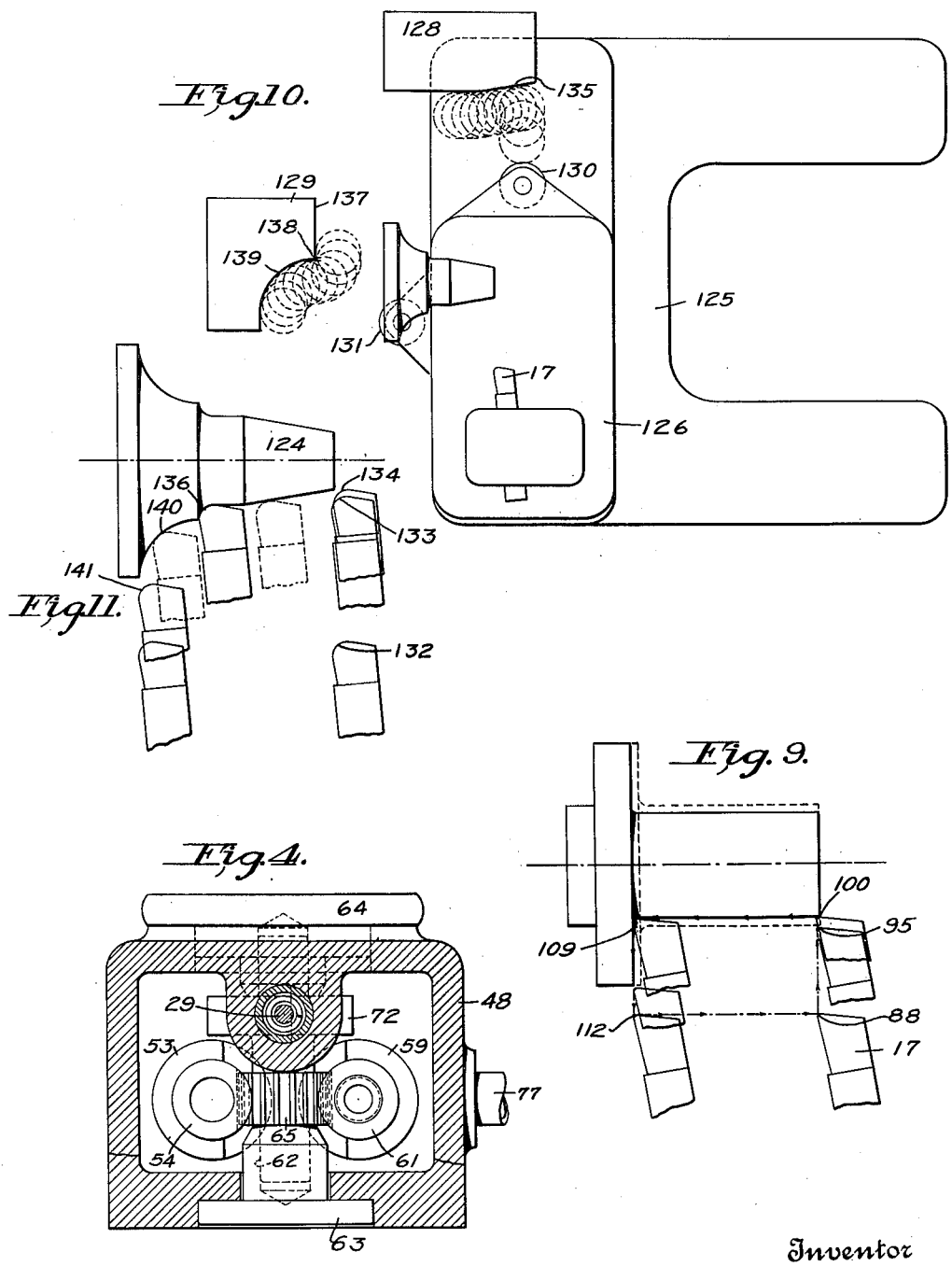

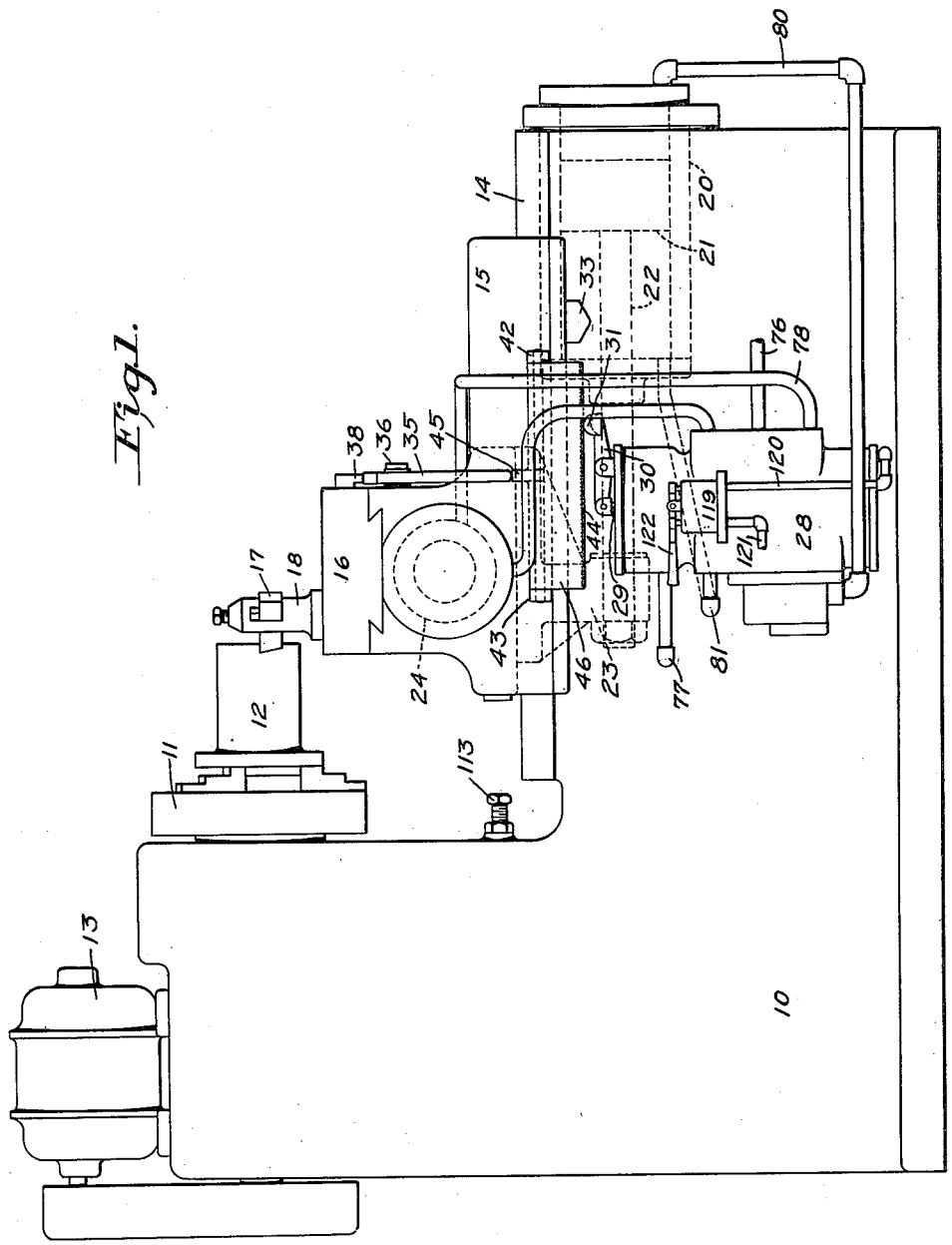

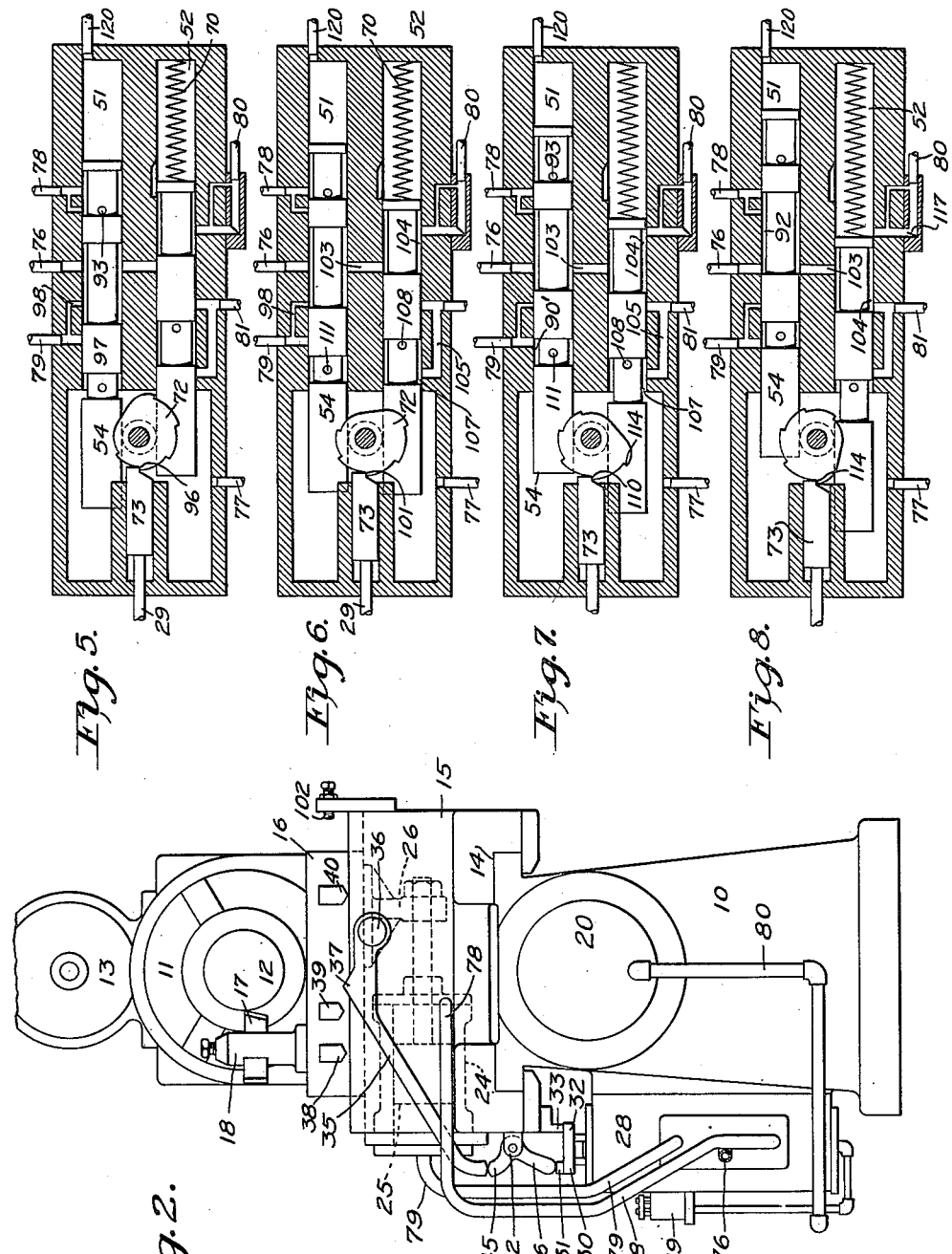

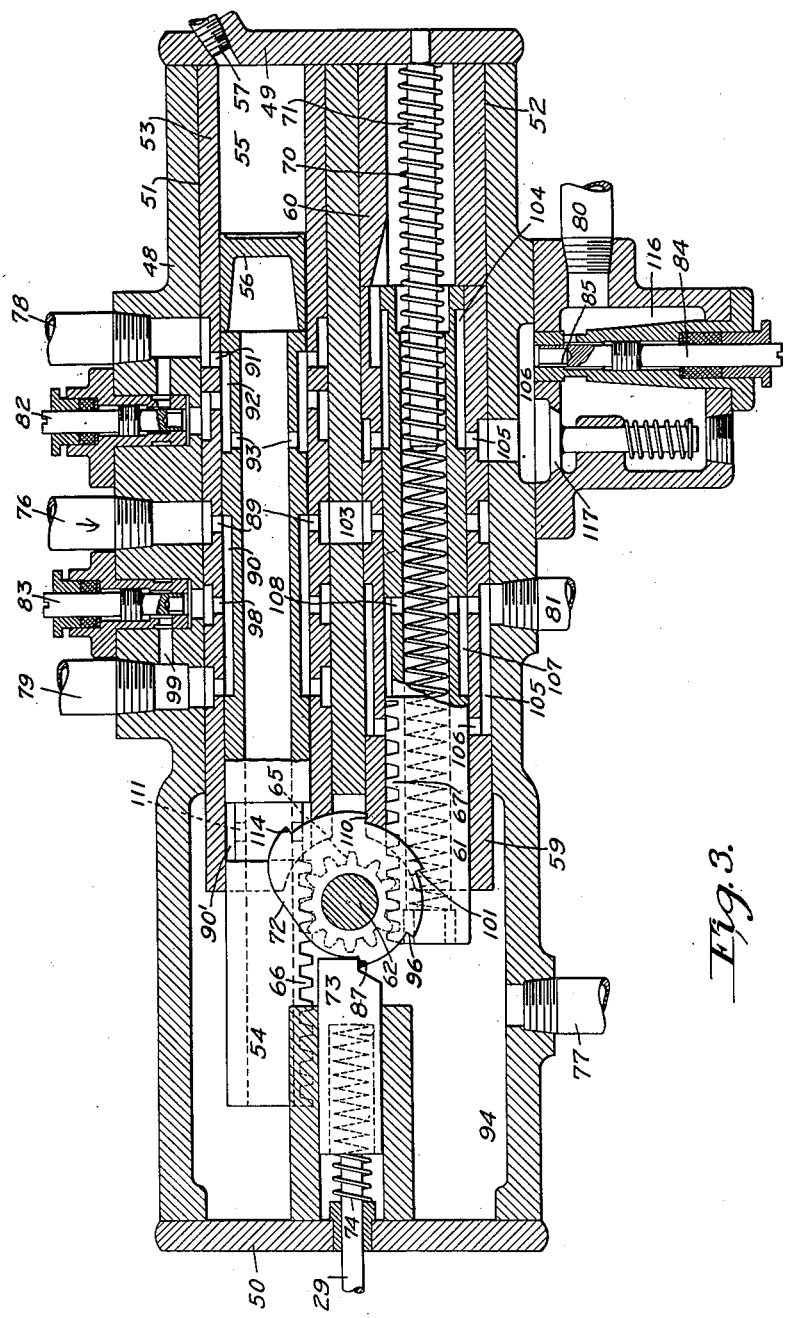

UNITED STATES PATENT OFFICE 1,920,596

HYDRAULIC ACTUATING AND CONTROL VALVE MEANS

Robert A. Schafer, Richmond, Ind., assignor to The National Automatic Tool Company, Richmond, Ind., a Corporation of Indiana Application February 19, 1929. Serial No. 341,200

24 Claims. (Cl. 60—97)

This invention is concerned with improvements in the field of hydraulic propulsion of machine tools and more specifically the employment of two cooperative motors whose operation serve to impart a combined longitudinal and transverse movement to a machine tool head to result in the forming of irregular contours on work-pieces arranged to be machined in such a tool. The invention in general centers around a unitary valve construction adapted to simultaneously control the motors and which valve means has new and novel features rendering it of wider application and possessing important advantages in valve constructions per se.

The characteristics of hydraulic propulsion have long been known and it was early conceived that these characteristics could be employed to advantage in the operation of machine tools. Accordingly many and varied arrangements for operating a single tool head have been developed but owing to the many difficult problems encountered, not apparent until actual application was attempted, this development has been extremely slow and only comparatively recently has such propulsion means been found satisfactory and employed to any substantial extent.

In the machining of metal products of irregular contour it becomes necessary, especially on a lathe type of tool, that relative motion between the tool and the work-piece be provided in a transverse as well as longitudinal direction. Attempts have been made to adapt fluid propulsion to this type of machine and operation, but without any marked degree of success, one of the most difficult problems encountered being the necessity of maintaining an accurate time relation between the two motors acting in cross directions to each other to result in the necessary ultimate movement of the cutting tool in accordance with the contour to be machined. It has been discovered that an outstanding defect in the prior devices resided in the fact that the valve means heretofore employed for such an arrangement, if any relation has been maintained between the two fluid motors, has been of such complicated nature and cumbersome and unsightly dimensions as to render it impractical.

The present invention has for its general objects an arrangement of fluid motors and a compact valve construction therefor which results in a very accurately maintained timed relation between the propelling motors and includes a novel valve construction and control means for accomplishing these general objects.

An outstanding feature of the invention which makes such results possible resides in the form of valve means provided which constitutes a unitary valve means having a plurality of valve members therein, each valve member having suitable fluid connections to the respective motor to be controlled thereby. The valve members are positively connected by mechanical elements thereby assuring that the timed relation between the valve members, and therefore, between the fluid motors, will be accurately maintained. The arrangement permits the employment of a large number of fluid conduits some of which are of different capacity whereby the operated parts may be caused to move through a cycle of rapid and slow speeds and thereby result in a machine tool possessing a high production capacity.

The invention also has for its objects the provision of a control means of such arrangement that it may be controlled and actuated by either and both of the fluid motors in their successive movements through a working cycle. The actuating means for the double control valve is of very simple design having very few parts for a device capable of being controlled from the movements of either of the motors.

Other objects are more specifically directed to the unitary valve construction and include the idea of a double slide valve working on opposite sides of a transverse rotary shaft and thereby presenting a very compact symmetrical and well balanced valve of relatively short dimensions and of surprisingly few parts considering the number of fluid conduits and devices to be controlled thereby.

Other objects include the accomplishment of what may be called a leak-proof valve so rendered by reason of the construction presenting no mechanical elements projecting therefrom through stuffing boxes or openings of like nature which are exposed to the extreme pressures of the working fluid commonly employed in propulsion motors for actuating machine tools. The operating mechanism is totally enclosed within the casing, the major portion of which casing is in communication with the exhaust connection and which therefore serves to drain off all leakages around the valve members.

The construction of the valve which renders such results possible consists largely of an arrangement whereby the valve is initially set in the first operating position for the working cycle by the admission of pressure fluid to a piston means connected with the valve members and totally enclosed within the casing. Latch or interference means are provided, likewise within the casing, which latch means is successively and progressively tripped by the movements of the fluid motors which permits the positioning of the valve in its successive positions under the urging of impositive means such as a spring also enclosed within the valve casing.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 is a general organizational view of a machine tool embodying the general features of this invention. Fig. 2 is an end elevational view thereof looking from the right in Fig. 1. Fig. 3 is a detail cross sectional view of the unitary valve construction designed to control both fluid motors incorporated in the machine tool shown. Fig. 4 is a transverse sectional view of the valve shown in Fig. 3. Figs. 5, 6, 7 and 8 are somewhat diagrammatic views of the valve shown in Fig. 3 with the valve members occupying successive positions of a particular cycle described herein. Fig. 9 illustrates the movement of a cutting tool relative to a work-piece in accordance with the manner of machining it on the machine illustrated. Fig. 10 is a fragmentary view illustrating an arrangement of cams adapted to be applied to the machine shown herein to result in the forming of a differently shaped work-piece, and Fig. 11 illustrates the successive paths of movements of the cutting tool in machining a work-piece similar to that shown in Fig. 10.

Referring to Figs. 1 and 2 which exemplify the general and broader features of this invention, 10 indicates the main frame of a typical machine tool of which the present invention is especially well adapted for the operation thereof. The frame is provided with a fixed head having mounted therein a rotary spindle carrying the chuck 11 in which is mounted a work-piece 12. Rotation of the chuck 11 is derived from the electric motor 13 by any suitable driving connection.

The main frame is provided with a bed 14 upon which is slidably mounted the main slide 15 carrying thereon the auxiliary or cross slide 16 translatable transversely thereto in suitable guideways. The auxiliary head 16 carries the cutting tool 17 through the medium of a toolpost 18 rigidly fixed on the cross head 16. Longitudinal movement of the slide 15 is accomplished through a fluid motor consisting of a cylinder 20 having mounted therein the piston 21 connected through piston rod 22 to a downwardly projecting lug 23 rigid with the slide 15. A similar operating means for the cross slide 16 is provided consisting of a cylinder 24 having therein the piston 25 connected to the lug 26 rigid with the cross slide 16, it being observed that this operating mechanism is mounted on and movable with the main longitudinal slide 15.

The unitary valve construction designed to control these two fluid motors, as noted above, is shown at 28 and consists of a valve means to be later described in detail but for the present it may be noted is successively tripped and released by progressive lifting of the latch rod 29 through the medium of the pivoted lever 30, which in turn is accomplished by downward movement imparted to the cam 31 located at the outer end of the lever 30. This movement or actuation of the valve through the lever 30 is derived from two sources, i. e. by means of dogs mounted on the slide 15 adapted to engage the horizontal portion 32 of the cam on the lever 30, such a dog being shown at 33; and the other source is the cross slide, the mechanical connection including a long lever 35 pivoted to the longitudinal slide at 36 and presenting a cam surface 37 adapted to be engaged by the cams 38, 39 and 40 on the cross slide. Pivotally mounted on the front face of the longitudinal slide between the projecting ears 42 and 43 is a combined lever and cam slide 46 having the upraised arm 45 in continuous engagement with the lever 35 and a downwardly extending elongated cam portion 44 adapted to slide over the cam 31 as the longitudinal slide reciprocates on its ways. It may be readily understood that other arrangements could be resorted to in order to accomplish the sliding connection whereby the lever 30 may be actuated from the cross slide irrespective of the position of the longitudinal slide.

Referring now to the combined dual valve shown particularly in Figs. 3 and 4, this valve consists of a main casing 48 provided with end plates 49 and 50. Longitudinal bores 51 and 52 are formed within the main casing adapted to serve as valve chambers. The bore 51 has mounted therein the valve sleeve 53 having suitable fluid passages to be later described and adapted to be controlled by the valve member 54 slidable therein. The right end of the sleeve 53 serves as a cylinder 55 having slidable therein the piston 56 rigid with the valve member 54. A connection 57 serves to admit fluid to the cylinder when desired, as will be later described, to operate the piston 56 and thereby the valve mechanism.

The bore 52 has fitted therein the valve sleeve 59 and the spacer sleeve 60, the sleeves having suitable fluid passages therein adapted to be controlled by the valve member 61.

The valve members are positively connected together whereby they operate in exact timed relation by means of a mechanical construction consisting of a shaft 62 mounted transversely of the casing in the bearings 63 and 64 with the valve members positioned on opposite sides thereof in a balanced and symmetrical arrangement. The shaft 62 has rigid therewith a rack-gear 65 meshing with the rack 66 on the valve member 54 and the rack 67 on the valve member 61. The valve member 61 is made of a hollow construction and has extending therewithin a compression spring 70 surrounding the guide pin 71 operative to urge the valve members in a direction opposed to the fluid pressure admitted to the cylinder 55. The valve control and actuating means includes interference means consisting of a stepped cam 72 fixed on the shaft 62, which stepped cam is engaged by the latch member 73 normally urged into engagement with the cam by the spring 74. The latch member 73 is secured to the rod 29, which rod is adapted to be moved outwardly by the various dogs on the longitudinal and cross slides in the manner heretofore described.

The fluid connections will now be described and consist of a pipe 76 adapted to convey fluid under pressure to the valve mechanism from any desired source such as a hydraulic pump mounted on the machine tool and operated thereby. The pipe 77 is the exhaust connection and may lead to any desired point such as a sump from which the hydraulic pump draws the fluid to be returned through the pipe 76. 78 and 79 indicate flexible conduits leading to the right and left ends respectively of the cross cylinder 25. In like manner conduits 80 and 81 lead to the opposite ends of the cylinder 20 for operating the longitudinal slide.

In the specific type of valve means shown, each of the pipes 78, 79 and 80 have associated therewith a regulating valve 82, 83 and 84 respectively which valve in each case serves at appropriate periods in the cycle to furnish a reduced amount of fluid to the corresponding cylinder end and thereby result in the slow working traverse desired at various times in a complete working cycle. It may be readily understood that these auxiliaries to the general valve construction may or may not be employed in the various conduits in accordance with the particular cycle desired, which in turn depends upon the type of work to be machined. The specific construction of these regulating valves, although forming no part of the present invention, it may be noted however, is such that the opening presented to the flow of fluid consists of a portion of a relatively narrow elongated slot such as the slot 85 in the valve 84, whereby for even a very minute opening of the valve the area exposed to the flow of fluid is of a shape such that there are no narrowed portions capable of forming a lodging place for small particles of foreign mater unavoidably existing in the operating fluid.

The operation of the valve means in connection with the control of the conduits and fluid passages and thereby the tool slides will now be described. As shown in Fig. 3 the control valves are in what may be termed the first station with the working cycle initiated by the admission of air to the cylinder 55, whereby the valves are set in the positions shown against the opposition of the spring 70 and held in such a position by means of the latch 73 engaging the shoulder 87. The various movements will also be described in connection with Fig. 9. The arrowed lines in this figure indicate the path of movement of the tool point, the initial position thereof being indicated at 88. In this first position hydraulic fluid enters through the pipe, 76 passes through the port 89 of the sleeve 53, through the annular passage 90 of the valve member 54 and out the pipe 79 to the forward end of the cross cylinder 25, the rear end of the cylinder being connected to the conduit 78, port 91, passage 92 in the valve member, openings 93 therein and out the hollow interior of the valve member 54 to the chamber 94 and thence through the pipe 77 to the exhaust. During this period no fluid is admitted to the longitudinal cylinder. Operation of the cutting tool 17, as shown in Fig. 9, and during this position of the valve serves to advance the cutting tool 17 in a transverse direction to the point 95. At this point in the travel of the cross slide 16, the dog 39 engages the lever 35 rotating the cam 44 downwardly and which results in the withdrawal of the rod 29 and latch 73 an amount sufficient to permit the cam 72 to rotate to a position where the shoulder 96 engages the latch 73. The valve now occupies the position shown in Fig. 5.

In this second position the rapid forward traverse of the cross slide has been closed off by the piston portion 97 of the valve member 54 and fluid now passes through the port 98, through the regulating valve 83 and passage 99 out the conduit 79 to the forward end of the cross cylinder. Exhaust from the rear end of the cross cylinder takes place as before. No fluid is admitted to the longitudinal slide in this second position and the cutting tool 17 moves on a transverse slow working traverse to the point 100, shown in Fig. 9. When this point is reached, dog 38 on the cross slide cams the lever 35 downwardly, tripping the latch 73 permitting the cam to advance until the shoulder 101 engages the latch and the valve members are in the position shown in Fig. 6.

In this third position fluid is still admitted to the forward end of the cross cylinder but by reason of the fact that the cross slide has now engaged the adjustable set screw or stop means 102, no further transverse movement of the cross slide takes place. However, fluid is now admitted to the right end of cylinder 20. Fig. 1, through the conduit 76, ports 89, chamber 103, annular passage 104 of the valve member 61, ports 105 of the sleeve member 59, through passage 106, passages in the valve 84 and out the pipe 80. Exhaust from the left end of the longitudinal cylinder takes place through the pipe 81, annular chamber 105 in the valve sleeve, through ports 106 therein to the annular chamber 107 of the valve member, ports 108 therein and out the hollow interior to the exhaust pipe 77. During this position of the valve the cutting tool 17 moves along the work-piece to the left in Fig. 9 to the point 109 under slow working speed in accordance with the amount of opening through regulating valve 84 until the dog 33 engages the cam 32 and trips the latch 73, permitting the cam to rotate until the shoulder 110 engages the latch member and the valve members are then located in the position shown in Fig. 7.

In this fourth position the forward end of the cross cylinder 25 is open to exhaust through the pipe 79, annular passage 90' in the valve member, ports 111 therein and out the hollow interior of the valve member to the exhaust. The opposite end of the cross cylinder is connected through the regulating valve 82 and pipe 78 with the high pressure fluid and the tool 17 is thereby caused to move outwardly to the point 112. The right end of the cylinder operating the longitudinal slide still receives high pressure fluid thereto, but by reason of the longitudinal slide engaging the stop screw 113, further movement of the major slide to the left is prevented and the cutting tool receives a straight line motion outwardly, as above noted, until the point 112 is reached, at which time the dog 40 engages the cam 37 on the lever 35 and withdraws the latch member 73 permitting the cam to rotate and the valve members to move in their valve bores until the shoulder 114 engages the latch member 73 and the positions of the parts is that indicated in Fig. 8. In this position the cross cylinder has received its maximum outward movement and remains in that position while the longitudinal slide moves at a rapid rate to its retracted position which is to the right in Fig. 1. This movement occurs by reason of the high pressure fluid from the pipe 76 flowing through the annular chamber 92, middle chamber 103, annular chamber 104 of the lower valve member and out the pipe 81 to the left end of the longitudinal cylinder. The right end of the cylinder in the meantime exhausts through the pipe 80, chamber 116, through the check valve 117, and ports 105 direct to the exhaust, through the hollow interior of the valve member.

It may be observed that this arrangement of a check valve, in combination with the regulating valve, permits of a rapid exhaust for retraction of the main tool slide but a working forward traverse of any desired speed in accordance with the position of the regulating valve 84.

The above described movement continues until the tool 17 reaches the original point 88, as shown in Fig. 9, in which position it remains until a new cycle is initiated by means including the cylinder 55 and piston 56, heretofore mentioned. Located in any convenient position, such as that shown in Fig. 1, is a manually operable valve selectively adapted to admit air under pressure through the pipe 120 to the connection 57. The pipe 121 is shown leading to the valve 119 from any suitable source of pressure. Movement of the lever 122 in one direction connects this pipe 121 with the pipe 120 and release of the handle 122 permits it to return to its neutral position, in which position the air is permitted to exhaust from the cylinder 55.

The operation and arrangement of parts described is illustrative of one convenient and useful mode of operation and of a specific application of the invention. In Fig. 10 is illustrated a further and somewhat modified arrangement for machining a work-piece, such as that shown in Fig. 11 at 124. In Fig. 10 the character 125 indicates a tool head similar to the longitudinal slide 14 in Fig. 1, having mounted thereon a cross slide 126 corresponding to cross slide 16 in Fig. 1 carrying the tool 17. In this arrangement the machine is equipped with the cams or templets 128 and 129 which at definite periods are engaged by the rollers 130 and 131 respectively. The operation in this case is very similar to that described and may be accomplished with the same arrangement of fluid connections and positions of the valve heretofore described and the operation is as follows: In accordance with the position of the valve members shown in Fig. 3 the tool first advances rapidly in a transverse direction by movement of the cross slide from the point 132 to the point 133, at which time the valve mechanism is tripped and the valves move to the position shown in Fig. 5, the tool advancing on its working stroke until it reaches the point 134, at which time the valve mechanism is tripped by dog 38 and the valve members are moved to the positions shown in Fig. 6 with the roller 130 engaging the templet 128 along the inclined surface 135 which determines the inward position of the cutting tool as it receives a longitudinal movement in accordance with the longitudinal movement of the slide 125 until the cutting tool reaches the point 136, at which time the dog 33 trips the valve and the valve moves to the position shown in Fig. 7.

In this position the outward feed of the cross slide 126 is thrown on as shown by the fluid connections in Fig. 7. The pressure fluid still being admitted to the right end of the longitudinal cylinder through the pipe 80, the slide in its movement to the left is governed by the contour of the stop or templet 129, the roller 131 first engaging on the surface 137 until the outward movement of the cross line permits the roller to pass beyond the point 138, after which it follows the curved portion 139 and generating the surface 140 of the work-piece 124 until the cutting tool reaches the point 141 at which time the dog 40 trips the valve operating mechanism and causes the valve members to assume the position shown in Fig. 8 and the cutting tool to be simultaneously moved outward to its extreme retracted positions, by both the cross slide and the longitudinal slide until the cutting tool arrives at the original point indicated at 132 in Fig. 11.

Two modes of operation and application of this invention have been specifically described and illustrated and from this it may be readily seen that practically an infinite variety of forms and shapes may be machined by suitable modifications of the general features of this invention, such as the application of guiding templets or stops similar to those shown at 102 and 113 of Figs. 1 and 2 and at 128 and 129 in Fig. 10. Likewise it may be readily understood that the positions of the dogs and the number thereof on the machine may be varied as well as the relative positions of the valve members and fluid conduits in the valve assembly and thereby enable practically any desired shape of work-piece to be turned out.

The unitary assembly of the valve mechanism with the elements positively connected assure that the cycle will always be the same and that an accurate relation of the parts thereof is maintained and that thereby the fluid motors will co-operate and be actuated in proper timed relation to each other, so as to result in a machined surface accurate to an extreme degree heretofore not found possible in a machine tool receiving its actuation entirely through hydraulic means.

It may be observed with respect to the unitary valve assembly that in addition to having the features noted and being capable of controlling a plurality of fluid motors, it possesses a very compact appearance, being of relatively short dimensions and is well balanced and further possesses no joints which are exposed to the high pressures normally employed in this type of fluid actuating means which permit of the disagreeable leakages to the exterior thereof but rather any leakages which may occur must necessarily pass to the low pressure area to which the exhaust pipe is connected.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. A machine tool combining a support; a major tool element movably mounted thereon; fluid pressure operating means therefor; a second major element mounted on said machine tool; fluid pressure operating means therefor; cam template means for at least one of said elements to guide the movements thereof; a single positively related control valve means including simultaneously shiftable piston valve for both said fluid pressure operating means; and means for operating said valve means to produce a predetermined machine cycle, said valve means being arranged to vary the rate of flow of liquid and thereby the rate of movement of said elements during a single cycle.

2. A machine tool combining a support; a member translatably mounted thereon; fluid pressure operating means for said member; a head translatably mounted on and movable relative to said member; fluid pressure operating means for said head; and a unitary positively related control valve means for controlling both said fluid operating means in accurately timed relation, said control valve means comprising a plurality of shiftable piston valves; means normally tending to shift said valves; and automatically controlled interference means actuated by both said member and said head for controlling the movement of said valves.

3. A machine tool combining a support; a member translatably mounted thereon; fluid pressure operating means therefor; a head mounted on and movable relative to said member; fluid pressure means for causing said relative movement; a unitary control valve mechanism for both said fluid operating means; means on said member adapted to operate said valve mechanism by translation thereof; and also means on said head to operate said valve mechanism by the movement of said head relative to said member.

4. A machine tool combining a support; a member translatably mounted thereon; fluid pressure operating means therefor; a head mounted on said member and movable relative thereto; fluid pressure operating means for causing said relative movement; valve means for both said fluid pressure means; a control member connected to control said valve means and thereby the movement of said translatable member on the support and the movement of said head on the translatable member; means for actuating said control member by the movement of said translatable member; and means for actuating it from the movement of said head on the translatable member.

5. A machine tool combining a support; a member translatably mounted thereon; fluid pressure operating means therefor; a head mounted on and translatable transversely to said member; fluid pressure means for causing said transverse translation; valve means for both said fluid pressure means located on said support; a control member for said valve means; means for operating said control member in timed relation with the movement of said translatable member; an actuating member carried by said translatable member adapted to be operated by the movement of said head relative to said translatable member; and a slidable connection between said actuating member and said control member whereby the valve means may be controlled by the relative movement of said head irrespective of the position of said translatable member.

6. A machine tool combining a support; a member translatably mounted thereon; a head translatably mounted on and relative to said member; fluid pressure means for translating said head; valve means therefor mounted on said support; a control member therefor; an actuator adapted to be operated in accordance with said relative translatory movement; and a cam and slide bar connection between said actuator and control member whereby said valve may be controlled in timed relation with the translatory movement of the head relative to said translatable member irrespective of the position of the latter.

7. A machine tool combining a frame; a major machine element translatably mounted thereon; fluid pressure operating means therefor; a head mounted on said element and translatable relative thereto; fluid pressure means for causing said relative translation; valve means for both of said fluid pressure operating means; means for setting said valve means in an initial position; impositive means for urging said valve means in a direction opposite thereto; interference means for locating said valve in predetermined operative positions; means operated in timed relation with the translatory movement of said element for tripping said interference means; and means operated in timed relation with said relative translation of said head for tripping said interference means.

8. Fluid pressure actuating means combining a plurality of fluid motors associated in a common device; and a unitary valve means for controlling the fluid connections to said motors to cause them to operate in a related and predetermined cycle comprising a plurality of valve members; fluid connections from each valve member controlled thereby to its respective motor; means for positively and operatively connecting said valve members whereby they move in timed relation; and means for operating said valve members.

9. Fluid pressure actuating means combining a plurality of fluid motors associated in a common device; valve means having fluid connections to each of said motors for the control thereof; means for moving said valve means to an initial position; means for urging said valve means in the opposite direction; interference means for locating said valve means in predetermined operative positions; and a combined trip means therefor connected to be actuated in timed relation with either of said fluid motors in accordance with the movement thereof.

10. A double valve means comprising a plurality of sliding valve members of the piston type; gear means operatively and positively connecting said members whereby they are simultaneously operated in opposite directions and maintained in exact timed relation; means for simultaneously moving each of said valves in one direction to an initial position; means for urging said valves in the opposite direction; and automatically controlled interference means for positively and successively locating said valves in predetermined effective positions.

11. Valve means for controlling a plurality of fluid actuating devices comprising a rotary shaft; a plurality of valve members operatively connected thereto; fluid connections from each valve member to its respective fluid actuating device; means for rotating said shaft and for thereby moving said valve members in a respective corresponding direction; means for urging said shaft and valve members in respective opposite directions; stepped cam means movable in accordance with the movement of said shaft and members; and releasable interference means for engaging said cam means to position said valve members in corresponding operative positions.

12. A valve comprising a casing; a rotary shaft mounted therein; a plurality of valve members mounted in said casing and operatively connected to said rotary shaft; impositive means mounted in said casing for urging said valves in one direction; and fluid pressure means for moving said valves in the opposite direction.

13. A unitary valve construction adapted to control a plurality of devices comprising a casing; a plurality of valve members movably mounted therein; means operatively connecting said members whereby they are maintained in exact timed relation; a plurality of fluid passages and connections leading from each of said valve members; each of said valve members having a plurality of openings therein adapted to cooperate with predetermined ones of said passages respectively and to thereby control the rate and direction of flow of fluid with respect to the devices to be operated; and means for operating said valve members.

14. A unitary valve construction comprising a casing; a rotary shaft mounted therein; a pair of valve members slidably mounted in said casing on opposite sides of said shaft and operatively connected thereto whereby the valve members are operated in unison; means for operating said valve members; and independent fluid connections controlled by said valve members and adapted to connect each of said valve members with a fluid actuating device.

15. A unitary valve construction for controlling a plurality of fluid actuating devices comprising a casing having fluid connections thereto and having therein a plurality of valve members slidably mounted; means operatively connecting said valve members whereby they move simultaneously and in timed relation; a piston connected to one of said members operative in a cylinder bore; means for intermittently admitting fluid pressure to said bore to operate the valves in one direction; and impositive means for urging said valves in the opposite direction.

16. A unitary valve construction for controlling a pair of fluid actuating devices comprising a casing having a plurality of fluid connections thereto and said casing having therein, a pair of longitudinal bores; a valve member slidably mounted in each of said bores; a transverse shaft rotatably mounted in the casing; means for operatively connecting each of said valve members to said rotary shaft to move in timed relation; and means for reciprocating said valve members.

17. A unitary valve construction for controlling a plurality of fluid actuating devices combining a casing having a plurality of fluid connections thereto and having mechanism therein for controlling the opening of said fluid passages comprising a pair of longitudinal bores with which said fluid connections communicate, a slide valve member in each of said bores, a transverse shaft rotatively mounted between said valve members and having an operative connection with each member to cause movement thereof to be in timed relation, a cylinder formed at the end of one of said bores with a piston connected to the corresponding valve member operating therein, means for admitting pressure fluid thereto for operating said valve members, and spring means extending into the hollow bore of one of said valve members for operating the valve members in the opposite direction.

18. A unitary valve assembly adapted to control a plurality of associated fluid operating devices in accordance with a predetermined cycle comprising a casing; a plurality of valve members movably mounted therein; a plurality of fluid conduit means of unequal capacity connected with said casing and arranged to be controlled by said valve members whereby said fluid operating devices are caused to operate at relatively rapid and slow rates at various points in their cycle; means for connecting said valve members whereby they are maintained in a predetermined relation to each other; and means for operating said valve members.

19. A machine tool combining a support; a first member translatably mounted thereon; fluid pressure operating means therefor; a second translatably mounted member; a second fluid pressure means for translating said second member; a unitarily assembled valve means including a single casing and valve members slidable therein, for controlling both of said fluid pressure means; a single control element for said valve means; means for operating said control element from the translation of said first member; and means for operating said element from the translation of said second member.

20. A machine tool combining a frame; a member translatably mounted thereon; fluid pressure operating means therefor; a head translatably mounted on said member; fluid pressure means for translating said head on said member; valve means for both of said fluid pressure means for controlling the rate and direction of movement of said member and said head relative thereto, said valve means being progressively movable to successive positions corresponding to different events of the machine cycle; means for operating said valve means in timed relation with the movement of said member; and means for operating said valve means in timed relation with the movement of said head relative to said member.

21. Valve means for controlling a plurality of fluid actuating devices comprising a plurality of valve members positively connected together; fluid connections from each valve member to its respective fluid actuating device; means for simultaneously moving said valve members to an initial position; impositive means for urging said members in a direction opposite to said initial movement respectively; stepped cam means connected to and movable with said valve members; and releasable interference means for engaging said cam means adapted to determine successive valve positions.

22. A machine tool combining a first member translatable thereon; a second member independently translatable thereon; and a hydraulic transmission for translating each of said members through a predetermined cycle comprising a source of hydraulic fluid under pressure, a hydraulic motor for each of said members, fluid conduits connecting said source with said motors, simultaneously operative valve means arranged in a single casing for controlling the flow of fluid to produce forward and reverse movements of said motors and at variable rates of at least one of said motors during a single cycle, said valve means including means for producing successive steps in the cycle of one motor during a single step in the cycle of the other motor, and means for operating said valve means.

23. A machine tool combining a first member translatably mounted thereon; a second member translatable thereon independently of said first member; and a hydraulic transmission for operating said members through a predetermined cycle comprising a hydraulic motor for each of said members, a source of hydraulic fluid under pressure, fluid conduits connecting said source with said motors, and valve means therein including a plurality of simultaneously shiftable piston valves for simultaneously controlling both of said motors to produce movements of said members in forward and reverse directions and at variable rates of at least one of said members.

24. A machine tool combining a first member translatable thereon; a second member translatable thereon; cam templates for guiding the movements of said members; and a hydraulic transmission means for translating said members to produce a predetermined cycle comprising a hydraulic motor for each of said members, a source of hydraulic fluid under pressure, fluid conduits connecting said source and motor, valves therein operable in unison to simultaneously control both of said motors, said valves having means for varying the rate of flow of fluid and thereby the rate of translation of said members during a single cycle, and means for operating said valves.

ROBERT A. SCHAFER.